US011980977B2

(12) United States Patent
Schartner et al.

(10) Patent No.: US 11,980,977 B2
(45) Date of Patent: May 14, 2024

(54) SYSTEMS, METHODS, AND APPARATUS TO CONTROL WELD CURRENT IN A PREHEATING SYSTEM

(71) Applicant: Illinois Tool Works Inc., Glenview, IL (US)

(72) Inventors: Quinn William Schartner, Kaukauna, WI (US); James Lee Uecker, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 17/984,671

(22) Filed: Nov. 10, 2022

(65) Prior Publication Data

US 2023/0075751 A1    Mar. 9, 2023

Related U.S. Application Data

(63) Continuation of application No. 16/003,387, filed on Jun. 8, 2018, now Pat. No. 11,524,354.

(60) Provisional application No. 62/517,505, filed on Jun. 9, 2017.

(51) Int. Cl.
*B23K 9/10* (2006.01)
*B23K 9/32* (2006.01)

(52) U.S. Cl.
CPC .......... *B23K 9/1093* (2013.01); *B23K 9/1006* (2013.01); *B23K 9/1043* (2013.01); *B23K 9/32* (2013.01)

(58) Field of Classification Search
CPC .. B23K 9/1006; B23K 9/1043; B23K 9/1093; B23K 9/32; H02H 9/041
See application file for complete search history.

(56) References Cited

U.S. PATENT DOCUMENTS

| 2,365,958 A | 12/1944 | Holslag |
| 2,416,047 A | 2/1947 | Dolan |
| 2,976,462 A | 3/1961 | Miller |
| 3,030,495 A | 4/1962 | Anderson |

(Continued)

FOREIGN PATENT DOCUMENTS

| AT | 413801 | 6/2006 |
| CA | 2072711 | 12/1992 |

(Continued)

OTHER PUBLICATIONS

"ALT 304," Miller—The Power of Blue, Jun. 2001.

(Continued)

*Primary Examiner* — Nathaniel E Wiehe
*Assistant Examiner* — Dilnessa B Belay
(74) *Attorney, Agent, or Firm* — McAndrews, Held & Malloy, Ltd.

(57) ABSTRACT

Systems, methods, and apparatus to control weld current in a preheating system are disclosed. An example preheating power supply includes power conversion circuitry configured to output welding-type power via a first output power connector and a second output power connector, and a bypass path prevention circuit configured to prevent less than a threshold voltage applied to the first output power connector and the second output power connector from a different power supply from causing current to flow between the first output power connector and the second output power connector.

10 Claims, 4 Drawing Sheets

(56) References Cited

U.S. PATENT DOCUMENTS

| | | |
|---|---|---|
| 3,288,982 A | 11/1966 | Haruyoshi |
| 3,549,857 A | 12/1970 | Carter |
| 3,573,550 A * | 4/1971 | Baker, Jr. ............... H02H 3/066 361/103 |
| 3,725,629 A | 4/1973 | Vickers |
| 3,809,853 A | 5/1974 | Manz |
| 3,849,871 A | 11/1974 | Kaunitz |
| 3,912,980 A | 10/1975 | Crump |
| 3,946,349 A | 3/1976 | Haldeman |
| 4,160,967 A | 7/1979 | Beech |
| 4,188,419 A | 2/1980 | Detert |
| 4,222,023 A | 9/1980 | Beech |
| 4,329,561 A | 5/1982 | Schafer |
| 4,384,187 A | 5/1983 | Jackson |
| 4,426,565 A | 1/1984 | Rueter |
| 4,447,703 A | 5/1984 | Stol |
| 4,467,176 A | 8/1984 | Mizuno |
| 4,493,971 A | 1/1985 | Nawa |
| 4,531,040 A | 7/1985 | Nawa |
| 4,536,634 A | 8/1985 | Nawa |
| 4,546,234 A | 10/1985 | Ogasawara |
| 4,547,654 A | 10/1985 | Stol |
| 4,580,026 A | 4/1986 | Stol |
| 4,590,358 A | 5/1986 | Stol |
| 4,614,856 A | 9/1986 | Hori |
| 4,628,182 A | 12/1986 | Hori |
| 4,631,385 A | 12/1986 | Rothermel |
| 4,667,083 A | 5/1987 | Stol |
| 4,675,494 A | 6/1987 | Dilay |
| 4,728,761 A | 3/1988 | Mucha |
| 4,897,523 A | 1/1990 | Parks |
| 4,950,348 A | 8/1990 | Larsen |
| 4,954,691 A | 9/1990 | Parks |
| 4,973,821 A | 11/1990 | Martin |
| 5,043,557 A | 8/1991 | Tabata |
| 5,086,207 A | 2/1992 | Deam |
| 5,101,086 A | 3/1992 | Dion |
| 5,118,028 A | 6/1992 | Ogawa |
| 5,140,123 A | 8/1992 | Mitani |
| 5,148,001 A | 9/1992 | Stava |
| 5,208,433 A | 5/1993 | Hellegouarc |
| 5,270,516 A | 12/1993 | Hamamoto |
| 5,278,390 A | 1/1994 | Blankenship |
| 5,315,089 A | 5/1994 | Hughes |
| 5,319,179 A | 6/1994 | Joecks |
| 5,343,023 A | 8/1994 | Geissler |
| 5,349,156 A | 9/1994 | Madigan |
| 5,352,871 A | 10/1994 | Ross |
| 5,367,138 A | 11/1994 | Moss |
| 5,412,184 A | 5/1995 | McGaffigan |
| 5,461,215 A | 10/1995 | Haldeman |
| 5,466,916 A | 11/1995 | Iguchi |
| 5,504,309 A | 4/1996 | Geissler |
| 5,521,355 A | 5/1996 | Lorentzen |
| 5,526,561 A | 6/1996 | McGaffigan |
| 5,644,461 A | 7/1997 | Miller |
| 5,710,413 A | 1/1998 | King |
| 5,714,738 A | 2/1998 | Hauschulz |
| 5,739,506 A | 4/1998 | Hanton |
| 5,742,029 A | 4/1998 | Stava |
| 5,756,967 A | 5/1998 | Quinn et al. |
| 5,760,373 A | 6/1998 | Colling |
| 5,773,799 A | 6/1998 | Maxfield |
| 5,783,799 A | 7/1998 | Geissler |
| 5,832,765 A | 11/1998 | Ohashi |
| 5,844,193 A | 12/1998 | Nomura |
| 5,963,022 A | 10/1999 | Buda |
| 5,968,587 A | 10/1999 | Frankel |
| 5,994,659 A | 11/1999 | Offer |
| 6,002,104 A | 12/1999 | Hsu |
| 6,008,470 A | 12/1999 | Zhang |
| 6,043,471 A | 3/2000 | Wiseman |
| 6,051,810 A | 4/2000 | Stava |
| 6,077,369 A | 6/2000 | Kusano |
| 6,078,023 A | 6/2000 | Jones |
| 6,090,067 A | 7/2000 | Carter |
| 6,107,602 A | 8/2000 | Geissler |
| 6,115,273 A | 9/2000 | Geissler |
| 6,160,241 A | 12/2000 | Stava |
| 6,169,263 B1 | 1/2001 | Derby |
| 6,204,476 B1 | 3/2001 | Reynolds |
| 6,248,976 B1 | 6/2001 | Blankenship |
| 6,259,059 B1 | 7/2001 | Hsu |
| 6,265,688 B1 | 7/2001 | Lyshkow |
| 6,274,845 B1 | 8/2001 | Stava |
| 6,278,074 B1 | 8/2001 | Morlock |
| 6,292,715 B1 | 9/2001 | Rongo |
| 6,331,694 B1 | 12/2001 | Blankenship |
| 6,359,258 B1 | 3/2002 | Blankenship |
| 6,479,792 B1 | 11/2002 | Beiermann |
| 6,486,439 B1 | 11/2002 | Spear et al. |
| 6,515,259 B1 | 2/2003 | Hsu |
| 6,559,416 B1 | 5/2003 | Steenis |
| 6,583,386 B1 | 6/2003 | Ivkovich |
| 6,596,970 B2 | 7/2003 | Blankenship |
| 6,624,388 B1 | 9/2003 | Blankenship et al. |
| 6,642,482 B2 | 11/2003 | Rappl |
| 6,670,579 B2 | 12/2003 | Davidson et al. |
| 6,707,001 B1 | 3/2004 | Ulrich |
| 6,710,297 B1 | 3/2004 | Artelsmair |
| 6,720,529 B2 | 4/2004 | Davidson |
| 6,744,012 B2 | 6/2004 | Ueda |
| 6,747,247 B2 | 6/2004 | Holverson |
| 6,849,828 B2 | 2/2005 | Aigner |
| 6,906,284 B2 | 6/2005 | Kim |
| 6,909,067 B2 | 6/2005 | Davidson |
| 6,933,466 B2 | 8/2005 | Hutchison |
| 6,958,263 B2 | 10/2005 | Bhattacharyya |
| 6,974,931 B2 | 12/2005 | Holverson |
| 6,974,932 B2 | 12/2005 | Holverson |
| 6,995,338 B2 | 2/2006 | Hutchison |
| 7,002,103 B2 | 2/2006 | Holverson |
| 7,105,775 B2 | 9/2006 | Giese |
| 7,129,443 B2 | 10/2006 | Davidson |
| 7,145,101 B2 | 12/2006 | Tong |
| 7,244,905 B2 | 7/2007 | Das |
| 7,247,815 B2 | 7/2007 | Lajoie |
| 7,265,320 B2 | 9/2007 | Ou |
| 7,304,269 B2 | 12/2007 | Fulmer |
| 7,306,951 B1 | 12/2007 | Benson |
| 7,307,240 B2 | 12/2007 | Holverson |
| 7,351,933 B2 | 4/2008 | Huismann |
| 7,381,923 B2 | 6/2008 | Gordon et al. |
| 7,576,300 B2 | 8/2009 | Giese |
| 7,626,139 B2 | 12/2009 | Matsuguchi |
| 7,663,074 B2 | 2/2010 | Wells |
| 7,683,290 B2 | 3/2010 | Daniel |
| 7,762,830 B2 | 7/2010 | Roberts |
| 8,203,100 B2 | 6/2012 | Ueda |
| 8,288,686 B2 | 10/2012 | Kaufman |
| 8,304,692 B2 | 11/2012 | Ohkubo |
| 8,304,693 B2 | 11/2012 | Ma |
| 8,357,877 B2 | 1/2013 | Ma |
| 8,487,215 B2 | 7/2013 | Holverson |
| 8,604,388 B2 | 12/2013 | Dingeldein |
| 9,095,928 B2 | 8/2015 | Ash |
| 9,162,312 B2 | 10/2015 | Ma |
| 9,193,004 B2 | 11/2015 | Enyedy et al. |
| 9,193,005 B2 | 11/2015 | Ma |
| 9,227,262 B2 | 1/2016 | Wiryadinata |
| 9,233,432 B2 | 1/2016 | Zhang |
| 9,403,231 B2 | 8/2016 | Hutchison |
| 9,409,250 B2 | 8/2016 | Daniel |
| 9,463,523 B2 | 10/2016 | Roth |
| 9,539,662 B2 | 1/2017 | Hutchison |
| 9,669,486 B2 | 6/2017 | Dingeldein |
| 9,862,050 B2 | 1/2018 | Cole |
| 9,950,383 B2 | 4/2018 | Davidson |
| 10,232,458 B2 | 3/2019 | Grossauer |
| 10,406,621 B2 | 9/2019 | Salsich |
| 10,675,699 B2 | 6/2020 | Hsu |
| 10,843,288 B2 | 11/2020 | Salsich |
| 11,007,597 B2 | 5/2021 | Salsich |
| 2002/0008095 A1 | 1/2002 | Norrish |

(56) References Cited

U.S. PATENT DOCUMENTS

| | | |
|---|---|---|
| 2002/0045970 A1 | 4/2002 | Krause |
| 2002/0107825 A1 | 8/2002 | Manicke |
| 2002/0117487 A1 | 8/2002 | Corby |
| 2002/0117488 A1 | 8/2002 | Arndt |
| 2003/0010756 A1 | 1/2003 | Enyedy |
| 2003/0058149 A1 | 3/2003 | Jayadeva |
| 2004/0010342 A1 | 1/2004 | Thelen |
| 2004/0069759 A1 | 4/2004 | Davidson |
| 2004/0182828 A1 | 9/2004 | Schmidt |
| 2004/0222204 A1 | 11/2004 | Hutchison |
| 2004/0238511 A1 | 12/2004 | Matus |
| 2005/0072762 A1 | 4/2005 | Delgado |
| 2005/0082268 A1 | 4/2005 | Lajoie |
| 2005/0184039 A1 | 8/2005 | Stava |
| 2005/0218132 A1 | 10/2005 | Wells |
| 2005/0269306 A1 | 12/2005 | Fulmer |
| 2006/0138115 A1 | 6/2006 | Norrish |
| 2006/0163219 A1 | 7/2006 | Griffin |
| 2006/0163227 A1 | 7/2006 | Hillen |
| 2006/0163229 A1 | 7/2006 | Hutchison |
| 2007/0039935 A1 | 2/2007 | Justice |
| 2007/0051711 A1 | 3/2007 | Kachline |
| 2007/0056945 A1 | 3/2007 | Hammen |
| 2007/0084840 A1 | 4/2007 | Davidson |
| 2007/0102407 A1 | 5/2007 | Uezono |
| 2007/0170163 A1 | 7/2007 | Narayanan |
| 2007/0235434 A1 | 10/2007 | Davidson |
| 2007/0267394 A1 | 11/2007 | Beck |
| 2008/0053978 A1 | 3/2008 | Peters |
| 2008/0264916 A1 | 10/2008 | Nagano |
| 2008/0264917 A1 | 10/2008 | White |
| 2008/0264923 A1 | 10/2008 | White |
| 2009/0026188 A1 | 1/2009 | Schorghuber |
| 2009/0039066 A1 | 2/2009 | Centner |
| 2009/0173726 A1 | 7/2009 | Davidson et al. |
| 2009/0215302 A1 | 8/2009 | Roberts |
| 2010/0012637 A1 | 1/2010 | Jaegar |
| 2010/0059493 A1 | 3/2010 | McAninch |
| 2010/0096373 A1 | 4/2010 | Hillen |
| 2010/0096436 A1 | 4/2010 | Nangle |
| 2010/0133250 A1 | 6/2010 | Sardy |
| 2010/0176104 A1 | 7/2010 | Peters |
| 2010/0308026 A1 | 12/2010 | Vogel |
| 2010/0308027 A1 | 12/2010 | Vogel |
| 2010/0314371 A1 | 12/2010 | Davidson |
| 2011/0108527 A1 | 5/2011 | Peters |
| 2011/0114612 A1 | 5/2011 | Holverson |
| 2011/0163080 A1 | 7/2011 | Beck |
| 2011/0168678 A1 | 7/2011 | Takeda |
| 2011/0204034 A1 | 8/2011 | Schartner |
| 2011/0204035 A1 | 8/2011 | Grossauer |
| 2011/0297658 A1 | 8/2011 | Peters |
| 2011/0248007 A1 | 10/2011 | Takeda |
| 2011/0266269 A1 | 11/2011 | Kachline |
| 2012/0024828 A1 | 2/2012 | Oowaki |
| 2012/0061362 A1 | 3/2012 | Davidson |
| 2012/0074112 A1 | 3/2012 | Kotera |
| 2012/0097655 A1 | 4/2012 | Daniel |
| 2012/0248080 A1 | 10/2012 | Hutchison |
| 2012/0285932 A1 | 11/2012 | Yuan |
| 2012/0291172 A1 | 11/2012 | Wills |
| 2012/0298642 A1 | 11/2012 | Lambert |
| 2013/0112674 A1 | 5/2013 | Mnich |
| 2013/0112676 A1 | 5/2013 | Hutchison |
| 2013/0213942 A1 | 8/2013 | Peters |
| 2013/0256276 A1 | 10/2013 | Fisher |
| 2013/0264323 A1 | 10/2013 | Daniel |
| 2013/0270245 A1 | 10/2013 | Holverson |
| 2013/0313241 A1 | 11/2013 | Zander |
| 2014/0008328 A1 | 1/2014 | Enyedy |
| 2014/0008331 A1 | 1/2014 | Ogborn |
| 2014/0008339 A1 | 1/2014 | Ogborn |
| 2014/0008343 A1 | 1/2014 | Ash |
| 2014/0008344 A1 | 1/2014 | Enyedy |
| 2014/0008354 A1 | 1/2014 | Pletcher |
| 2014/0021183 A1 | 1/2014 | Peters |
| 2014/0021186 A1 | 1/2014 | Denney |
| 2014/0021187 A1 | 1/2014 | Denney |
| 2014/0021188 A1 | 1/2014 | Denney |
| 2014/0034621 A1 | 2/2014 | Daniel |
| 2014/0034622 A1 | 2/2014 | Barrett |
| 2014/0035279 A1 | 2/2014 | Narayanan |
| 2014/0042129 A1 | 2/2014 | Daniel |
| 2014/0042138 A1 | 2/2014 | Matthews |
| 2014/0048524 A1 | 2/2014 | Ash |
| 2014/0116994 A1 | 5/2014 | Peters |
| 2014/0131321 A1 | 5/2014 | Enyedy |
| 2014/0131339 A1 | 5/2014 | Fischer |
| 2014/0158669 A1 | 6/2014 | Davidson |
| 2014/0177109 A1 | 6/2014 | Curtis |
| 2014/0183176 A1 | 7/2014 | Hutchison |
| 2014/0199878 A1 | 7/2014 | Ihde |
| 2014/0217077 A1 | 8/2014 | Davidson |
| 2014/0251965 A1 | 9/2014 | Wiryadinata |
| 2014/0251971 A1 | 9/2014 | Hearn |
| 2014/0263193 A1 | 9/2014 | Denney |
| 2014/0263194 A1 | 9/2014 | Narayanan |
| 2014/0263228 A1 | 9/2014 | Peters |
| 2014/0263229 A1 | 9/2014 | Peters |
| 2014/0263230 A1 | 9/2014 | Peters |
| 2014/0263231 A1 | 9/2014 | Peters |
| 2014/0263234 A1 | 9/2014 | Peters |
| 2014/0263237 A1 | 9/2014 | Daniel |
| 2014/0263241 A1 | 9/2014 | Henry |
| 2014/0263243 A1 | 9/2014 | Marschke |
| 2014/0263251 A1 | 9/2014 | Enyedy |
| 2014/0319103 A1 | 10/2014 | Stabb et al. |
| 2014/0366721 A1 | 12/2014 | Roy |
| 2014/0367370 A1 | 12/2014 | Hutchison |
| 2014/0374391 A1 | 12/2014 | Cole |
| 2015/0001184 A1 | 1/2015 | Cole |
| 2015/0001197 A1 | 1/2015 | Marschke |
| 2015/0014283 A1 | 1/2015 | Peters |
| 2015/0028010 A1 | 1/2015 | Peters |
| 2015/0028011 A1 | 1/2015 | Peters |
| 2015/0028012 A1 | 1/2015 | Peters |
| 2015/0083702 A1 | 3/2015 | Scott |
| 2015/0090703 A1 | 4/2015 | Peters |
| 2015/0105898 A1 | 4/2015 | Adams |
| 2015/0151375 A1 | 6/2015 | Peters |
| 2015/0158105 A1 | 6/2015 | Peters |
| 2015/0158106 A1 | 6/2015 | Peters |
| 2015/0158107 A1 | 6/2015 | Latessa |
| 2015/0158108 A1 | 6/2015 | Peters |
| 2015/0183044 A1 | 7/2015 | Peters |
| 2015/0183045 A1 | 7/2015 | Peters |
| 2015/0209889 A1 | 7/2015 | Peters |
| 2015/0209905 A1 | 7/2015 | Matthews |
| 2015/0209906 A1 | 7/2015 | Denney et al. |
| 2015/0209907 A1 | 7/2015 | Narayanan |
| 2015/0209908 A1 | 7/2015 | Peters |
| 2015/0209910 A1 | 7/2015 | Denney |
| 2015/0209913 A1 | 7/2015 | Denney |
| 2015/0213921 A1 | 7/2015 | Koide |
| 2015/0251275 A1 | 9/2015 | Denney et al. |
| 2015/0273612 A1 | 10/2015 | Peters |
| 2015/0283638 A1 | 10/2015 | Henry |
| 2015/0283639 A1 | 10/2015 | Henry |
| 2016/0074973 A1 | 3/2016 | Kachline |
| 2016/0144444 A1 | 5/2016 | Davidson |
| 2016/0167151 A1 | 6/2016 | Mehn |
| 2016/0175975 A1 | 6/2016 | Lattner |
| 2016/0199939 A1 | 7/2016 | Hartman |
| 2016/0221105 A1 | 8/2016 | Henry et al. |
| 2016/0288235 A1 | 10/2016 | Davidson |
| 2016/0318112 A1 | 11/2016 | Hutchison |
| 2017/0064804 A1 | 3/2017 | Namburu |
| 2017/0080512 A1 | 3/2017 | Centner |
| 2017/0165778 A1 | 6/2017 | Hsu |
| 2017/0225255 A1 | 8/2017 | Zwayer |
| 2018/0085842 A1 | 3/2018 | Lattner |
| 2018/0236585 A1 | 8/2018 | Davidson |
| 2018/0333798 A1 | 11/2018 | Uecker |
| 2018/0354052 A1 | 12/2018 | Schartner |

(56) References Cited

U.S. PATENT DOCUMENTS

| | | |
|---|---|---|
| 2018/0354057 A1 | 12/2018 | Sigl |
| 2018/0354075 A1 | 12/2018 | Liu |
| 2019/0061039 A1 | 2/2019 | Doyle |

FOREIGN PATENT DOCUMENTS

| | | | | |
|---|---|---|---|---|
| CA | 2242273 | 2/2000 | | |
| CA | 2862671 | 10/2013 | | |
| CA | 2883947 | 3/2014 | | |
| CH | 472922 | 5/1969 | | |
| CN | 1031342 | 3/1989 | | |
| CN | 2125475 | 12/1992 | | |
| CN | 2181354 | 11/1994 | | |
| CN | 1102480 | 5/1995 | | |
| CN | 2215372 | 12/1995 | | |
| CN | 1191790 | 9/1998 | | |
| CN | 1220626 | 6/1999 | | |
| CN | 1298778 | 6/2001 | | |
| CN | 1496774 | 5/2004 | | |
| CN | 1558706 | 12/2004 | | |
| CN | 1600486 | 3/2005 | | |
| CN | 1640603 | 7/2005 | | |
| CN | 1665633 | 9/2005 | | |
| CN | 1712168 | 12/2005 | | |
| CN | 1714978 | 1/2006 | | |
| CN | 1836818 | 9/2006 | | |
| CN | 1871093 | 11/2006 | | |
| CN | 101041202 | 9/2007 | | |
| CN | 101062530 | 10/2007 | | |
| CN | 201098775 | 8/2008 | | |
| CN | 101360580 | 2/2009 | | |
| CN | 101376191 | 3/2009 | | |
| CN | 101434017 | 5/2009 | | |
| CN | 201249331 | 6/2009 | | |
| CN | 101474707 | 7/2009 | | |
| CN | 101715378 | 5/2010 | | |
| CN | 101804495 | 8/2010 | | |
| CN | 101821049 | 9/2010 | | |
| CN | 101862886 | 10/2010 | | |
| CN | 102059476 | 5/2011 | | |
| CN | 102126077 | 7/2011 | | |
| CN | 102470473 | 5/2012 | | |
| CN | 102554418 | 7/2012 | | |
| CN | 102596475 | 7/2012 | | |
| CN | 102649202 | 8/2012 | | |
| CN | 102770228 | 11/2012 | | |
| CN | 102825370 | 12/2012 | | |
| CN | 102861975 | 1/2013 | | |
| CN | 102873475 | 1/2013 | | |
| CN | 202639618 | 1/2013 | | |
| CN | 202824943 | 3/2013 | | |
| CN | 103347639 | 10/2013 | | |
| CN | 103600161 | 2/2014 | | |
| CN | 103624378 | 3/2014 | | |
| CN | 104043895 | 9/2014 | | |
| CN | 104115085 | 10/2014 | | |
| CN | 104263897 | 1/2015 | | |
| CN | 104493368 | 4/2015 | | |
| CN | 104508161 | 4/2015 | | |
| CN | 104511680 | 4/2015 | | |
| CN | 104968465 | 10/2015 | | |
| CN | 105246634 | 1/2016 | | |
| CN | 105377493 | 3/2016 | | |
| CN | 105414726 | 3/2016 | | |
| CN | 105710503 | 6/2016 | | |
| CN | 105880814 | 8/2016 | | |
| CN | 205437448 | 8/2016 | | |
| CN | 206065630 | 4/2017 | | |
| CN | 206216093 | 6/2017 | | |
| DE | 2228701 | 12/1972 | | |
| DE | 2501928 | 7/1976 | | |
| DE | 19808383 | 9/1999 | | |
| DE | 212004000048 | 6/2006 | | |
| DE | 102016010341 | 3/2017 | | |
| EP | 0150543 | 8/1985 | | |
| EP | 0194045 | 9/1986 | | |
| EP | 0204559 | 12/1986 | | |
| EP | 0387223 | 9/1990 | | |
| EP | 0936019 A2 | 8/1999 | | |
| EP | 0936019 A3 | 3/2001 | | |
| EP | 1232825 | 8/2002 | | |
| EP | 2218537 | 8/2010 | | |
| EP | 2286949 | 2/2011 | | |
| EP | 2322315 | 5/2011 | | |
| EP | 2522453 | 11/2012 | | |
| EP | 2892680 | 7/2015 | | |
| EP | 2781291 | 10/2015 | | |
| FR | 1443701 | 6/1966 | | |
| JP | S5719166 | 2/1982 | | |
| JP | S57109573 | 7/1982 | | |
| JP | S583784 | 1/1983 | | |
| JP | S5874278 | 5/1983 | | |
| JP | S58119466 | 7/1983 | | |
| JP | S60108175 | 6/1985 | | |
| JP | S60108176 | 6/1985 | | |
| JP | S60170577 | 9/1985 | | |
| JP | 61186172 A | * 8/1986 | ........... | B23K 9/1735 |
| JP | S61186172 | 8/1986 | | |
| JP | S629773 | 1/1987 | | |
| JP | S6297773 | 5/1987 | | |
| JP | S6471575 | 3/1989 | | |
| JP | H03285768 | 12/1991 | | |
| JP | H06277840 | 10/1994 | | |
| JP | H07204848 | 8/1995 | | |
| JP | 10097327 A | * 4/1998 | | |
| JP | H1097327 | 4/1998 | | |
| JP | H11156542 | 6/1999 | | |
| JP | 2001276971 | 10/2001 | | |
| JP | 2003205385 | 7/2003 | | |
| JP | 2003311409 | 11/2003 | | |
| JP | 2005034853 | 2/2005 | | |
| JP | 2006205189 | 8/2006 | | |
| JP | 2007504003 | 3/2007 | | |
| JP | 2009072814 | 4/2009 | | |
| JP | 4950819 | 6/2012 | | |
| JP | 2014176890 | 9/2014 | | |
| KR | 1020060133016 | 12/2006 | | |
| KR | 20080009816 | 1/2008 | | |
| KR | 20100120562 | 11/2010 | | |
| KR | 1020120027764 | 3/2012 | | |
| KR | 101497460 | 3/2015 | | |
| MX | 2011000579 | 3/2011 | | |
| SU | 872102 | 10/1981 | | |
| WO | 9640465 | 12/1996 | | |
| WO | 9965635 | 12/1999 | | |
| WO | 0075634 | 12/2000 | | |
| WO | 0132347 | 5/2001 | | |
| WO | 0153030 | 7/2001 | | |
| WO | 2005030422 | 4/2005 | | |
| WO | 2014140783 | 9/2014 | | |
| WO | 2014155180 | 10/2014 | | |
| WO | 2015124977 | 8/2015 | | |
| WO | 2015125008 | 8/2015 | | |

OTHER PUBLICATIONS

"Maxstar 200 SD, DX, and LX," Miller Electric Mfg. Co., Oct. 2003.
Bondy et al., "Graph Theory with Applications," Department of Combinatorics and Optimization, University of Waterloo, 1976, p. 7-8.
Canadian Office Action Appln No. 3,005,408 dated Mar. 19, 2019.
Canadian Office Action Appln No. 3,119,550 dated Jul. 22, 2022.
Canadian Office Action Appln. No. 3,066,619 dated Mar. 31, 2021.
Canadian Office Action Appln. No. 3,066,677 dated Mar. 16, 2021.
Canadian Office Action Appln. No. 3,066,687 dated Mar. 16, 2021.
Canadian Office Action Appln. No. 3,066,731 dated Apr. 14, 2021.
Canadian Office Action Appln. No. 3,066,740 dated Apr. 15, 2021.
European Office Action Appln No. 18735131.7 dated Jul. 13, 2021.
European Office Action Appln No. 18735143.2 dated Mar. 24, 2021.
European Office Action Appln No. 18735144.0 dated Dec. 18, 2020.
European Office Action Appln No. 18735144.0 dated Dec. 21, 2020.

(56) References Cited

OTHER PUBLICATIONS

European Office Action Appln No. 18735144.0 dated Jul. 13, 2021.
European Office Action Appln No. 18735144.0 dated Mar. 9, 2022.
European Office Action Appln No. 19839586.5 dated Jul. 27, 2021.
European Office Action Appln No. 20164462.2 dated Sep. 7, 2020.
European Office Communication with extended European Search Report Appln No. 22164117.8 dated Jul. 7, 2022.
Final Office Action U.S. Appl. No. 16/005,456 dated Jan. 5, 2022 (22 pgs).
Gupta, "A low temperature hydrogen sensor based on palladium nanoparticles," Published in 2014.
Int'l Search Report and Written Opinion Appln No. PCT/U2019/049109 dated Dec. 2, 2019 (11 pgs).
Int'l Search Report and Written Opinion Appln No. PCT/U2019/067491 dated Jun. 25, 2020.
Int'l Search Report and Written Opinion Appln No. PCT/US2019/050972, dated Nov. 14, 2019, (13 pgs).
Int'l Search Report and Written Opinion for PCT/US2016/065265 dated Mar. 14, 2017 (16 pages).
Int'l Search Report and Written Opinion for PCT/US2018/029770 dated Sep. 12, 2018 (13 pgs.).
Int'l Search Report and Written Opinion for PCT/US2018/035087 dated Sep. 19, 2018 (15 pgs.).
Int'l Search Report and Written Opinion for PCT/US2018/036852 dated Oct. 2, 2018 (17 pgs).
Int'l Search Report and Written Opinion for PCT/US2018/036898 dated Oct. 1, 2018 (14 pgs.).
Int'l Search Report and Written Opinion for PCT/US2018/036900 dated Oct. 5, 2018 (15 pgs.).
Int'l Search Report and Written Opinion for PCT/US2018/036906 dated Oct. 1, 2018 (15 pgs.).
Int'l Search Report and Written Opinion for PCT/US2018/036914 dated Oct. 2, 2018 (14 pgs.).
Int'l Search Report and Written Opinion for PCT/US2018/036915 dated Oct. 1, 2018 (15 pgs).
Int'l Search Report and Written Opinion for PCT/US2018/036919 dated Oct. 2, 2018 (13 pgs.).
Int'l Search Report and Written Opinion for PCT/US2018/049888 dated Feb. 1, 2019 (14 pgs.).
Int'l Search Report and Written Opinion for PCT/US2018/052384 dated Feb. 12, 2019 (12 pgs.).
International Search Report from PCT application No. PCT/US2014/017864, dated Aug. 22, 2014, 9 pgs.
International Search Report from PCT application No. PCT/US2014/041201, dated Nov. 4, 2014, 11 pg.
International Search Report from PCT application No. PCT/US2014/045872, dated Nov. 4, 2014, 10 pgs.
International Search Report from PCT Application No. PCT/US2014/055529, dated Mar. 6, 2015, 9 pgs.
International Search Report from PCT application No. PCT/US2015/045715, dated Jan. 7, 2016, 12 pgs.
International Search Report from PCT application No. PCT/US2015/055040, dated Feb. 3, 2016, 11 pgs.
International Search Report from PCT application No. PCT/US2015/056121, dated Apr. 4, 2016, 11 pgs.
International Search Report from PCT application No. PCT/US2016/017385, dated Jul. 19, 2016, 13 pgs.
International Search Report from PCT application No. PCT/US2013/073490 dated May 13, 2014, 10 pgs.
International Search Report from PCT application No. PCT/US2013/073863 dated May 2, 2014, 15 pgs.
International Search Report from PCT application No. PCT/US2013/077710 dated May 9, 2014, 12 pgs.
International Search Report from PCT application No. PCT/US2014/014241 dated May 9, 2014, 8 pgs.
Lincoln Electric, "Storing and Redrying Electrodes," Published in 2011.
Mohamed Cad-el-Hak, "MEMB Design and Fabrication" translated by Haixia Zhang, et al., Feb. 28, 2010, pp. 458-459.
N.A.: "Drahtgluhe", Aug. 23, 2016 (Aug. 23, 2016), XP055510057, Wikipedia, Retrieved from the Internet: URL:https://de.wikipedia.Org/w/index.php7title=Drahtgl%C3%BChe&oldid=157333005, [retrieved on Sep. 26, 2018], with machine translation, 2 pages.
Non-Final Office Action U.S. Appl. No. 15/343,992 dated Mar. 7, 2019 (18 pgs.).
Non-Final Office Action U.S. Appl. No. 15/498,249 dated Sep. 23, 2019 (43 pgs).
Office Action from U.S. Appl. No. 15/498,249 dated Apr. 20, 2018.
PCT International Search Report & Written Opinion of PCT/US2012/063783 dated Mar. 1, 2013, 12 pages.
PCT, IPRP, issued in connection with PCT/US2018/036898, dated Dec. 19, 2019, 7 pages.
PCT, IPRP, issued in connection with PCT/US2018/036900, dated Dec. 19, 2019, 7 pages.
Pitrun, "The effect of welding parameters on levels of diffusible hydrogen in weld metal deposited using gas shield rutile flux cored wires," Published in 2004.
European Examination Report Appln No. 22164117.8 dated Oct. 9, 2023.

\* cited by examiner

SYSTEMS, METHODS, AND APPARATUS TO CONTROL WELD CURRENT IN A PREHEATING SYSTEM

RELATED APPLICATIONS

This patent application is a continuation of U.S. patent application Ser. No. 16/003,387, filed Jun. 8, 2018, entitled "Systems, Methods, and Apparatus to Control Weld Current in a Preheating System," and claims priority to U.S. Provisional Patent Application No. 62/617,505, filed Jun. 9, 2017, entitled "Systems, Methods, and Apparatus to Control Weld Current in a Preheating System." The entireties of U.S. patent application Ser. No. 16/003,387 and U.S. Provisional Patent Application No. 62/617,505 are incorporated herein by reference.

BACKGROUND

Welding is a process that has increasingly become ubiquitous in all industries. Welding is, at its core, simply a way of bonding two pieces of metal. A wide range of welding systems and welding control regimes have been implemented for various purposes. In continuous welding operations, metal inert gas (MIG) welding and submerged arc welding (SAW) techniques allow for formation of a continuing weld bead by feeding welding wire, shielded by inert gas or granular flux, from a welding torch. Such wire feeding systems are available for other welding systems, such as tungsten inert gas (TIG) welding. Electrical power is applied to the welding wire and a circuit is completed through the workpiece to sustain a welding arc that melts the electrode wire and the workpiece to form the desired weld.

BRIEF SUMMARY

This disclosure relates generally to welding and, more particularly, to systems, methods, and apparatus to control weld current in a preheating system.

BRIEF DESCRIPTION OF THE DRAWINGS

The figures are not necessarily to scale. Where appropriate, the same or similar reference numerals are used in the figures to refer to similar or identical elements.

DETAILED DESCRIPTION

Figure 1:
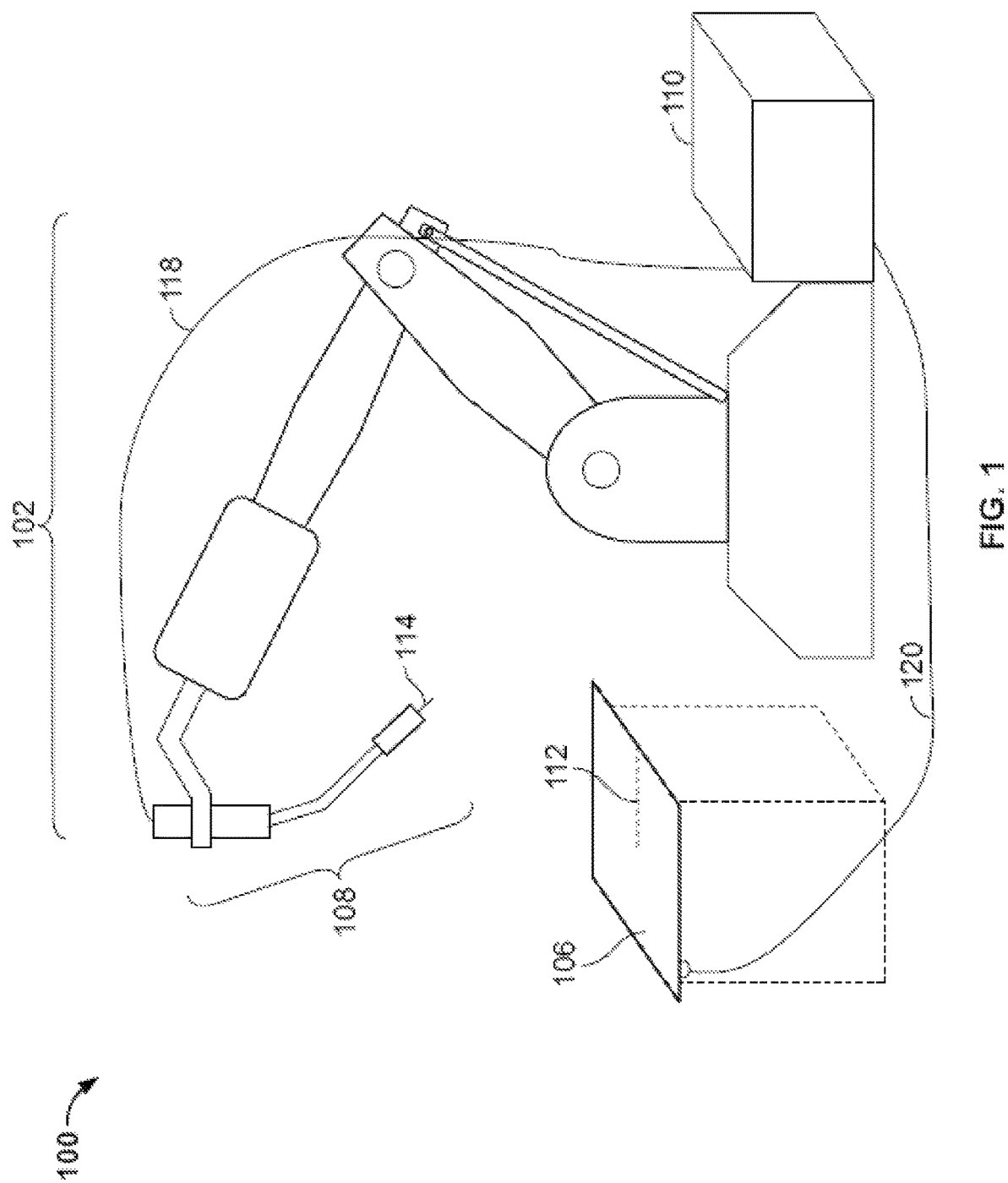
FIG. 1 illustrates an example robotic welding system, in accordance with aspects of this disclosure.

As used herein, the word "exemplary" means "serving as an example, instance, or illustration." The embodiments described herein are not limiting, but rather are exemplary only. It should be understood that the described embodiments are not necessarily to be construed as preferred or advantageous over other embodiments. Moreover, the term "embodiments" does not require that all embodiments of the disclosure include the discussed feature, advantage, or mode of operation.

As used herein, a wire-fed welding-type system refers to a system capable of performing welding (e.g., gas metal arc welding (GMAW), gas tungsten arc welding (GTAW), submerged arc welding (SAW), etc.), brazing, cladding, hardfacing, and/or other processes, in which a filler metal is provided by a wire that is fed to a work location, such as an arc or weld puddle.

As used herein, a welding-type power source refers to any device capable of, when power is applied thereto, supplying welding, cladding, plasma cutting, electrode preheating, induction heating, laser (including laser welding, laser hybrid, and laser cladding), carbon arc cutting or gouging and/or resistive preheating, including but not limited to transformer-rectifiers, inverters, converters, resonant power supplies, quasi-resonant power supplies, switch-mode power supplies, etc., as well as control circuitry and other ancillary circuitry associated therewith.

As used herein, preheating refers to heating the electrode wire prior to a welding arc and/or deposition in the travel path of the electrode wire. As used herein, the term "preheat voltage" refers to a measured voltage representative of the voltage across a section of electrode conducting preheating current, but not necessarily the exact voltage across that section.

Some disclosed examples describe electric currents being conducted "from" and/or "to" locations in circuits and/or power supplies. Similarly, some disclosed examples describe "providing" electric current via one or more paths, which may include one or more conductive or partially conductive elements. The terms "from," "to," and "providing," as used to describe conduction of electric current, do not necessitate the direction or polarity of the current. Instead, these electric currents may be conducted in either direction or have either polarity for a given circuit, even if an example current polarity or direction is provided or illustrated.

Disclosed example preheating power supplies include: power conversion circuitry configured to output welding-type power via a first output power connector and a second output power connector; and a bypass path prevention circuit configured to prevent less than a threshold voltage applied to the first output power connector and the second output power connector from a different power supply from causing current to flow between the first output power connector and the second output power connector.

In some examples, the bypass path prevention circuit includes a diode configured to increase a forward voltage drop from the first output power connector to the second output power connector. Some example preheating power supplies further include a controller configured to control the power conversion circuitry to output an electrode preheating voltage based on the forward voltage drop.

Some example preheating power supplies further include a switching element configured to selectively couple the first output power connector to the second output power connector; and a switching control circuit configured to selectively control the switching element to decouple the first output power connector and the second output power connector. In some examples, the switching control circuit is configured to control the switching element to decouple the first output power connector and the second output power connector when the power conversion circuitry is not outputting current via the first output power connector and the second output power connector. In some examples, the switching control circuit is configured to control the switching element to couple the first output power connector and the second output power connector when the power conversion circuitry is outputting current via the first output power connector and the second output power connector.

In some examples, the bypass path prevention circuit includes a resistor. In some examples, the bypass path prevention circuit includes a load switch. In some examples, the bypass path prevention circuit includes a negative temperature coefficient thermistor. In some examples, the welding-type power comprises electrode preheating current.

Disclosed example welding power source interconnection cables include: a first termination configured to be coupled to a first welding-type power connector; a second termination configured to be coupled to a second welding-type power connector; and a forward voltage increase circuit configured to increase a voltage drop from the first termination to the second termination.

Some example welding power source interconnection further include a third welding-type power connector connected to the first termination and configured to receive a third termination such that the third termination is connected to the first termination. In some examples, the forward voltage increase circuit includes a diode configured to set a minimum voltage required to conduct current from the first termination to the second termination. In some examples, the forward voltage increase circuit includes two or more diodes connected in series and configured to set the minimum voltage required to conduct current from the first termination to the second termination. In some examples, the forward voltage increase circuit includes a resistor. In some examples, the forward voltage increase circuit includes a negative temperature coefficient thermistor.

Referring to FIG. 1, an example welding system 100 is shown in which a robot 102 is used to weld a workpiece 106 using a welding tool 108, such as the illustrated bent-neck (i.e., gooseneck design) welding torch (or, when under manual control, a handheld torch), to which power is delivered by welding equipment 110 via conduit 118 and returned by way of a ground conduit 120. The welding equipment 110 may comprise, inter alia, one or more power sources (each generally referred to herein as a "power supply"), a source of a shielding gas, a wire feeder, and other devices. Other devices may include, for example, water coolers, fume extraction devices, one or more controllers, sensors, user interfaces, communication devices (wired and/or wireless), etc.

The welding system 100 of FIG. 1 may form a weld (e.g., at weld joint 112) between two components in a weldment by any known electric welding techniques. Known electric welding techniques include, inter alia, shielded metal arc welding (SMAW), MIG, flux-cored arc welding (FCAW), TIG, laser (e.g., laser welding, laser cladding, laser hybrid), sub-arc welding (SAW), stud welding, friction stir welding, and resistance welding. MIG, TIG, hot wire cladding, hot wire TIG, hot wire brazing, multiple arc applications, and SAW welding techniques, inter alia, may involve automated or semi-automated external metal filler (e.g., via a wire feeder). In multiple arc applications (e.g., open arc or sub-arc), the preheater may preheat the wire into a pool with an arc between the wire and the pool. Optionally, in any embodiment, the welding equipment 110 may be arc welding equipment having one or more power supplies, and associated circuitry, that provides a direct current (DC), alternating current (AC), or a combination thereof to an electrode wire 114 of a welding tool (e.g., welding tool 108). The welding tool 108 may be, for example, a TIG torch, a MIG torch, or a flux cored torch (commonly called a MIG "gun"). The electrode wire 114 may be tubular-type electrode, a solid type wire, a flux-core wire, a seamless metal core wire, and/or any other type of electrode wire.

As will be discussed below, the welding tool 108 may employ a contact tip assembly that heats the electrode wire 114 prior to forming a welding arc using the electrode wire 114, which provides multiple benefits for certain welding applications. Some of these benefits are disclosed in U.S. patent application Ser. No. 15/343,992, filed Nov. 4, 2016, entitled "Systems, Methods, and Apparatus to Preheat Welding Wire." The entirety of U.S. patent application Ser. No. 15/343,992 is incorporated herein by reference.

In the welding system 100, the robot 102, which is operatively coupled to welding equipment 110 (e.g., welding and/or preheating equipment) via conduit 118 and ground conduit 120, controls the location of the welding tool 108 and operation of the electrode wire 114 (e.g., via a wire feeder) by manipulating the welding tool 108 and triggering the starting and stopping of the current flow (whether a preheating current and/or welding current) to the electrode wire 114 by sending, for example, a trigger signal to the welding equipment 110 (e.g., welding and/or preheating equipment). When welding current is flowing, a welding arc is developed between the electrode wire 114 and the workpiece 106, which ultimately produces a weldment. The conduit 118 and the electrode wire 114 thus deliver welding current and voltage sufficient to create the welding arc between the electrode wire 114 and the workpiece 106.

Figure 2A:
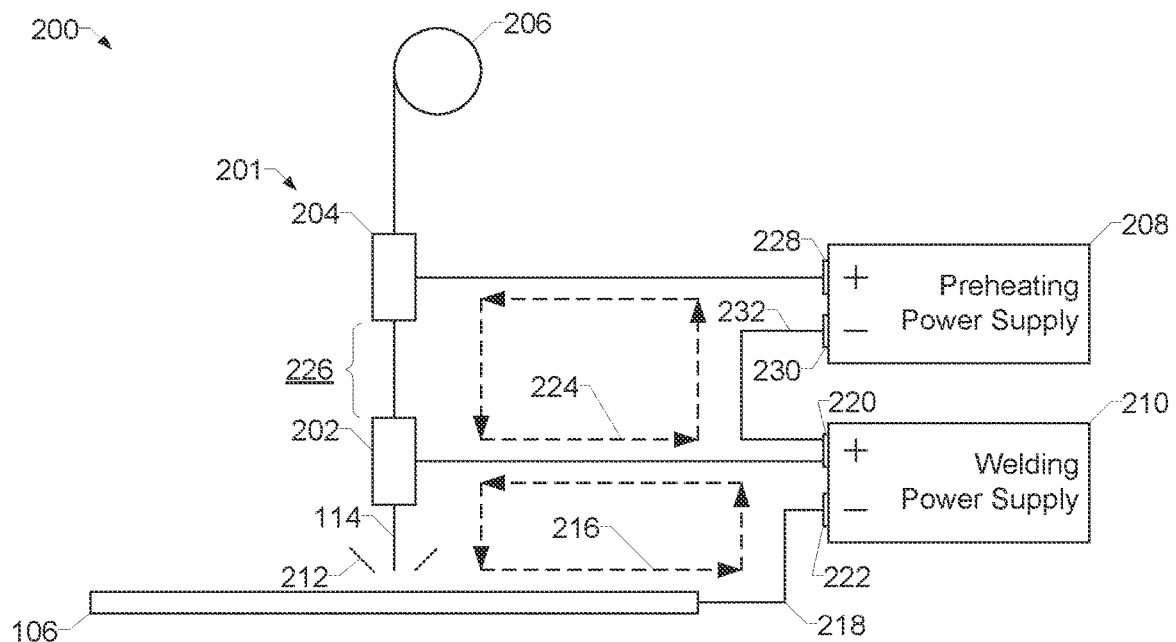
FIG. 2A is a block diagram illustrating preheating and welding current paths in a conventional welding system using resistive preheating.

FIG. 2A is a block diagram illustrating preheating and welding current paths in a conventional welding system 200 using resistive preheating. The conventional welding system 200 includes a weld torch 201 having a first contact tip 202 and a second contact tip 204. The system 200 further includes an electrode wire 114 fed from a wire spool 206, a preheating power supply 208, and a welding power supply 210. The system 200 is illustrated in operation as producing a welding arc 212 between the electrode wire 114 and a workpiece 106.

In operation, the electrode wire 114 passes from the wire spool 206 through the second contact tip 204 and the first contact tip 202, between which the preheating power supply 208 generates a preheating current to heat the electrode wire 114. Specifically, in the configuration shown in FIG. 2A, the preheating current enters the electrode wire 114 via the second contact tip 204 and exits via the first contact tip 202. At the first contact tip 202, a welding current may also enter the electrode wire 114. The welding current is generated, or otherwise provided by, the welding power supply 210. The welding current exits the electrode wire 114 and returns via the workpiece 106. When the electrode wire 114 makes contact with a target metal workpiece 106, an electrical circuit is completed and the welding current flows through the electrode wire 114, across the metal work piece(s) 106, and returns to the welding power supply 210. The welding current causes the electrode wire 114 and the parent metal of the work piece(s) 106 in contact with the electrode wire 114 to melt, thereby joining the work pieces as the melt solidifies. By preheating the electrode wire 114, a welding arc 212 may be generated with reduced arc energy. Generally speaking, the preheating current is proportional to the distance between the contact tips 202, 204 and the electrode wire 114 size.

The welding current is generated, or otherwise provided by, a welding power supply 210, while the preheating current is generated, or otherwise provided by, the preheating power supply 208. The preheating power supply 208 and the welding power supply 210 may ultimately share a common power source (e.g., a common generator or line current connection), but the current from the common power source is converted, inverted, and/or regulated to yield the two separate currents—the preheating current and the welding current. For instance, the preheat operation may be facilitated with a single power source and associated converter circuitry, in which case three leads may extend from a single power source.

During operation, the system 200 establishes a welding circuit 214 to conduct welding current, which is illustrated by a weld current path 216. The weld current path 216 flows from the welding power supply 210 to the first contact tip 202 and returns to the welding power supply 210 via the welding arc 212, the workpiece 106, and a work lead 218. To enable connection between the welding power supply 210 and the first contact tip 202 and the workpiece 106, the welding power supply 210 includes terminals 220, 222 (e.g., a positive terminal and a negative terminal).

During operation, the preheating power supply establishes a preheating circuit to conduct preheating current, which is represented by a preheat current path 224 through a section 226 of the electrode wire 114. To enable connection between the preheating power supply 208 and the contact tips 202, 204, the preheating power supply 208 includes terminals 228, 230. The preheating current path 224 flows from the welding power supply 210 to the second contact tip 204, the section 226 of the electrode wire 114, the first contact tip 202, and returns to the preheating power supply 208 via a cable 232 connecting the terminal 220 of the welding power supply 210 to the terminal 230 of the preheating power supply 208.

Because the preheating current path 224 is superimposed with the welding current path 216 over the connection between the first contact tip 202 and the power supplies 208, 210, the cable 232 may enable a more cost-effective single connection between the first contact tip 202 and the power supplies 208, 210 (e.g., a single cable) than providing separate connections for the welding current to the first contact tip 202 and for the preheating current to the first contact tip 202.

Figure 2B:
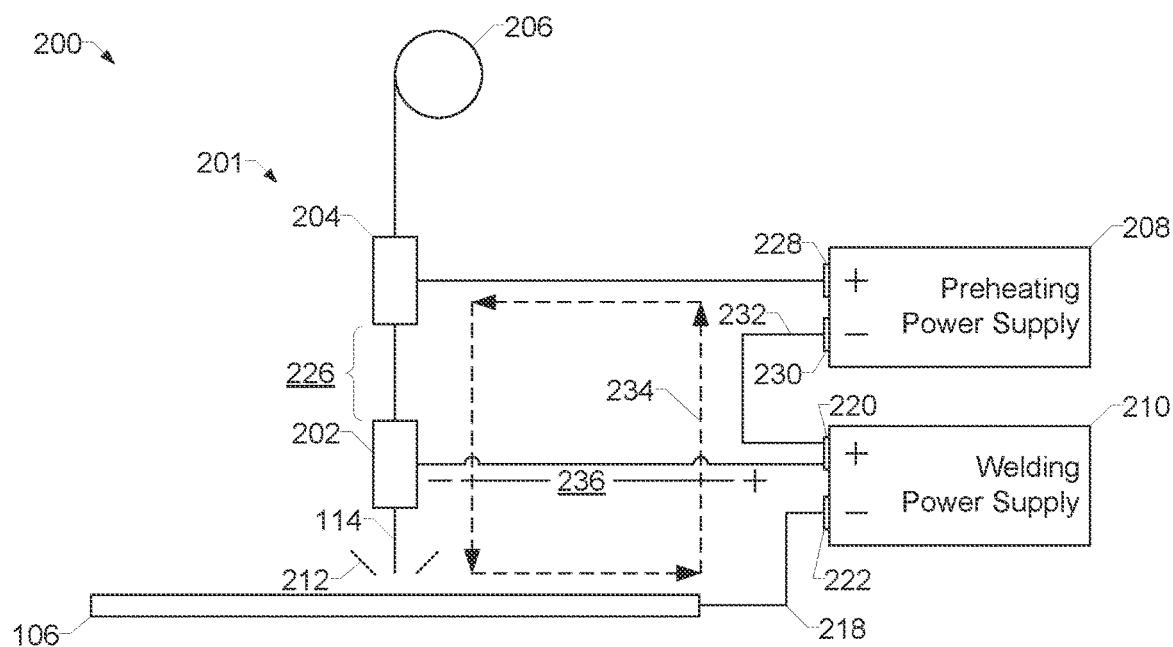
FIG. 2B is a block diagram illustrating an alternative welding current path that may occur during weld start conditions in the conventional welding system of FIG. 2A.

As illustrated in FIG. 2B, the weld current may flow through second current path 234, in which the current exits the terminal 220 of the welding power supply 210, flows through the cable 232 to the terminal 230 of the preheating power supply 208, exits the terminal 228 of the preheating power supply 208, flows to the second contact tip 204, through the electrode wire 114, through the welding arc 212, and through the workpiece 106, and returns via the work lead 218 to the terminal 222 of the welding power supply 210 to complete the current path.

Because there are two paths 216, 234 for the welding power source current, the welding current will split between the paths 216, 234 in an inverse relationship to the resistance. The ratio of current in the paths 216, 234 will be such that the current takes the path of least resistance and the total energy dissipated is minimized. Therefore, the current in the preheat current path 224 can vary substantially and cause inconsistency with arc starts.

Stated another way, a voltage between the terminal 220 and the first contact tip 202 provides a driving voltage 236 for current to flow through the preheating power supply 208. The driving voltage 236 increases when the length of conductor between the terminal 220 and the first contact tip 202 increases.

Figure 3:
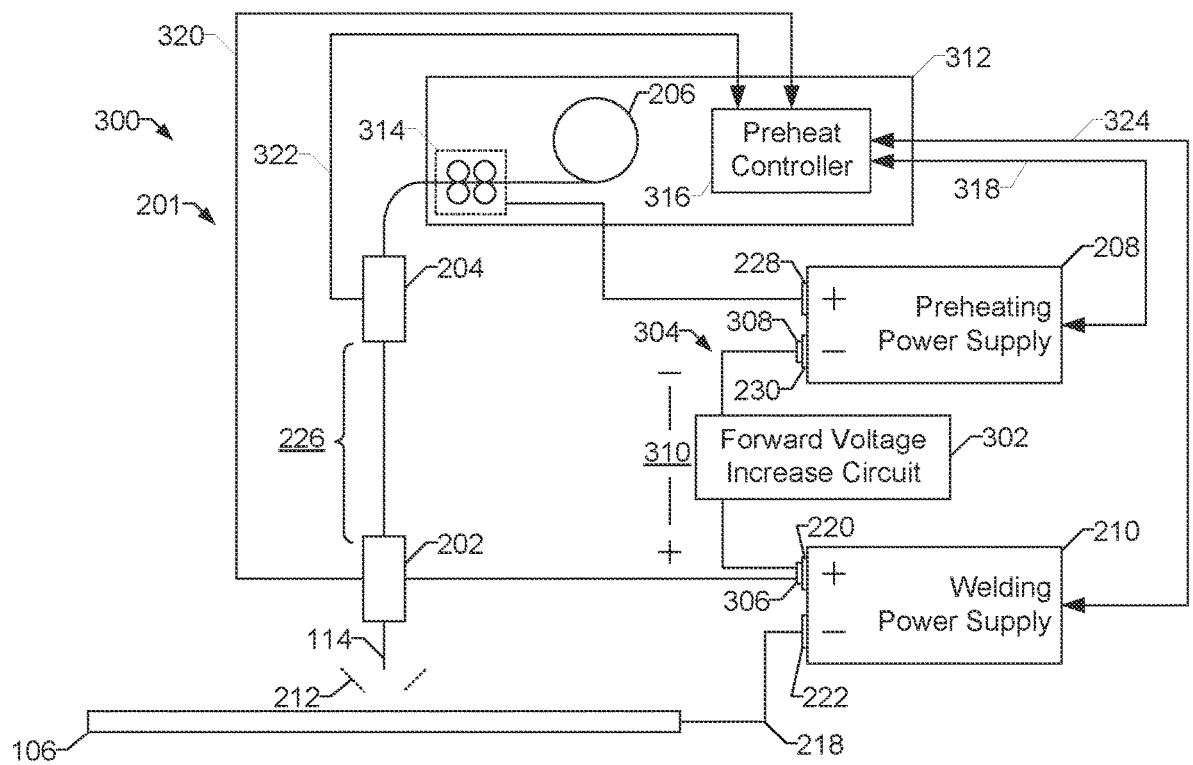
FIG. 3 is a block diagram of an example welding system using resistive preheating and including a forward voltage increase circuit that reduces or prevents weld current flow through a preheating power source, in accordance with aspects of this disclosure.

FIG. 3 is a block diagram of an example welding system 300 using resistive preheating and including a forward voltage increase circuit 302 that reduces or prevents weld current flow through the preheating power supply 208. The example welding system 300 of FIG. 3 includes the weld torch 201, the first contact tip 202, the second contact tip 204, the electrode wire 114, the wire spool 206, the preheating power supply 208, and the welding power supply 210. In the example of FIG. 3, the terminal 230 of the preheating power supply 208 is connected to the terminal 220 of the welding power supply 210, and both terminals 220, 230 are connected to the first contact tip 202.

The example forward voltage increase circuit 302 reduces or prevents the weld current from traversing the current path 234 (illustrated in FIG. 2B) through the terminals 228, 230 of the preheating power supply 208 by increasing a forward voltage 310 from the terminal 220 of the welding power supply 210 to the terminals 228 and 230 to a sufficiently high forward voltage (e.g., a higher voltage than the driving voltage 236). The forward voltage may be configured based on the expected welding voltage range output by the welding power supply 210. By increasing the forward voltage drop from the terminal 220 to the terminal 230, the weld current flows through the current path 216 instead of to the preheating power supply 208.

The forward voltage increase circuit 302 is part of a welding power source interconnection cable 304 connected between the terminals 220, 230 of the power supplies 208, 210. The example interconnection cable 304 includes a first termination 306 that can be coupled to the terminal 220 of the welding power supply 210 and a second termination 308 that can be coupled to the terminal 230 of the preheating power supply 208. The forward voltage increase circuit 302 increases a forward voltage 310 from the termination 306 to the termination 308.

As illustrated in FIG. 3, the terminal 228 of the preheating power supply 228 may be coupled to the electrode wire 114 via a contact point in a wire feeder 312 supplying the electrode wire 114. An example contact point is a conductive roller of a wire drive motor 314 (e.g., an idle roller of the wire drive motor 314).

The example wire feeder 312 may include a preheat controller 316 configured to provide preheating commands 318 (e.g., target current, target voltage, etc.) to the preheating power supply 208 based on voltage feedback 320, 322 from the contact tips 202, 204 and/or based on welding information 324 from the welding power supply 210.

While example polarities are illustrated in FIGS. 2A, 2B, and 3, other polarities may be used where the preheating current at least partially cancels the welding current between the first contact tip 202 and the terminals 220, 222, 228, 230 of the power supplies 208, 210.

Figure 4:
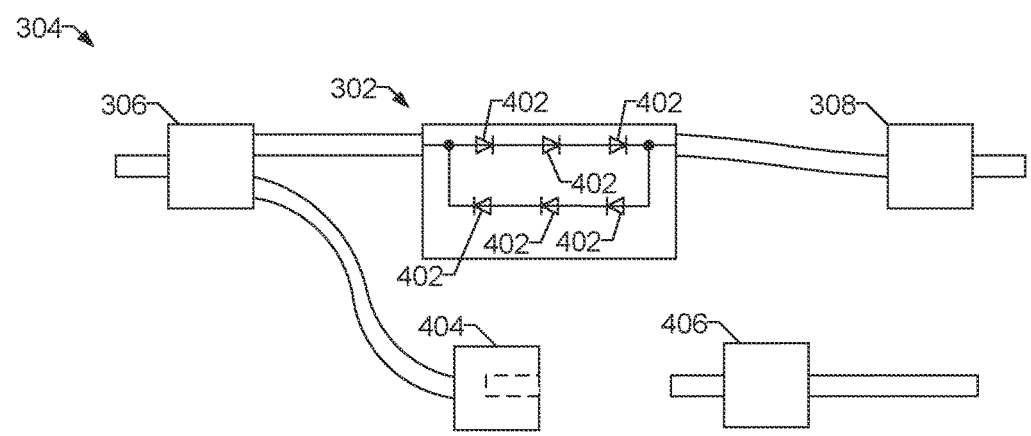
FIG. 4 is an example implementation of the forward voltage increase circuit of FIG. 3.

FIG. 4 illustrates an example implementation of the welding power source interconnection cable 304 of FIG. 3, including an example implementation of the forward voltage increase circuit 302 of FIG. 3.

The example forward voltage increase circuit 302 includes one or more diodes 402 in series with the preheat current flow path such that the forward voltage drop of the diode(s) 402 is higher than that of the driving voltage 236 of FIG. 2B. Because the driving voltage 236 cannot overcome the forward voltage drop required by the diodes 402, the added voltage drop provided by the diodes 402 may prevent the weld current from flowing to the preheating power supply 208 and cause the weld current to flow instead to the first contact tip 202 to follow the weld current path 216.

The example forward voltage increase circuit 302 includes diodes 402 for either direction of current flow such that there is a current path regardless of polarity of the voltage across the forward voltage increase circuit 302. In some other examples, the forward voltage increase circuit 302 only includes the diodes 402 in one direction, such that the forward voltage increase circuit 302 enables current flow in only one direction (e.g., polarity-dependent).

Additionally or alternatively, the forward voltage increase circuit 302 may include a resistance to divert more of the weld current to the first contact tip 202 away from the preheating power supply. Other circuits and/or circuit elements may also be used to reduce or prevent the flow of weld current through the cable 304.

To enable connection of the weld cable 304 to the preheating power supply 208 and the welding power supply 210, the example terminations 306, 308 of FIG. 4 include standard welding connectors configured to be connected to welding studs, Euro-style connectors, and/or any other type of connector that may be found on a welding-type power supply. Additionally or alternatively, one or both of the terminations 306, 308 may include a connector to be hard wired to a power bus of the power supplies 208, 210.

The example termination 306 of FIG. 4 includes a third connector 404, such as a weld stud coupled to the termination 306. The third connector 404 enables a second connection to be made (e.g., via a connector 406) between the termination 306 and the first contact tip 202. The third connector 404 provides the pathway for the welding current to flow between the terminal 220 and the first contact tip 202 (e.g., without traversing the preheating power supply 208).

Figure 5:
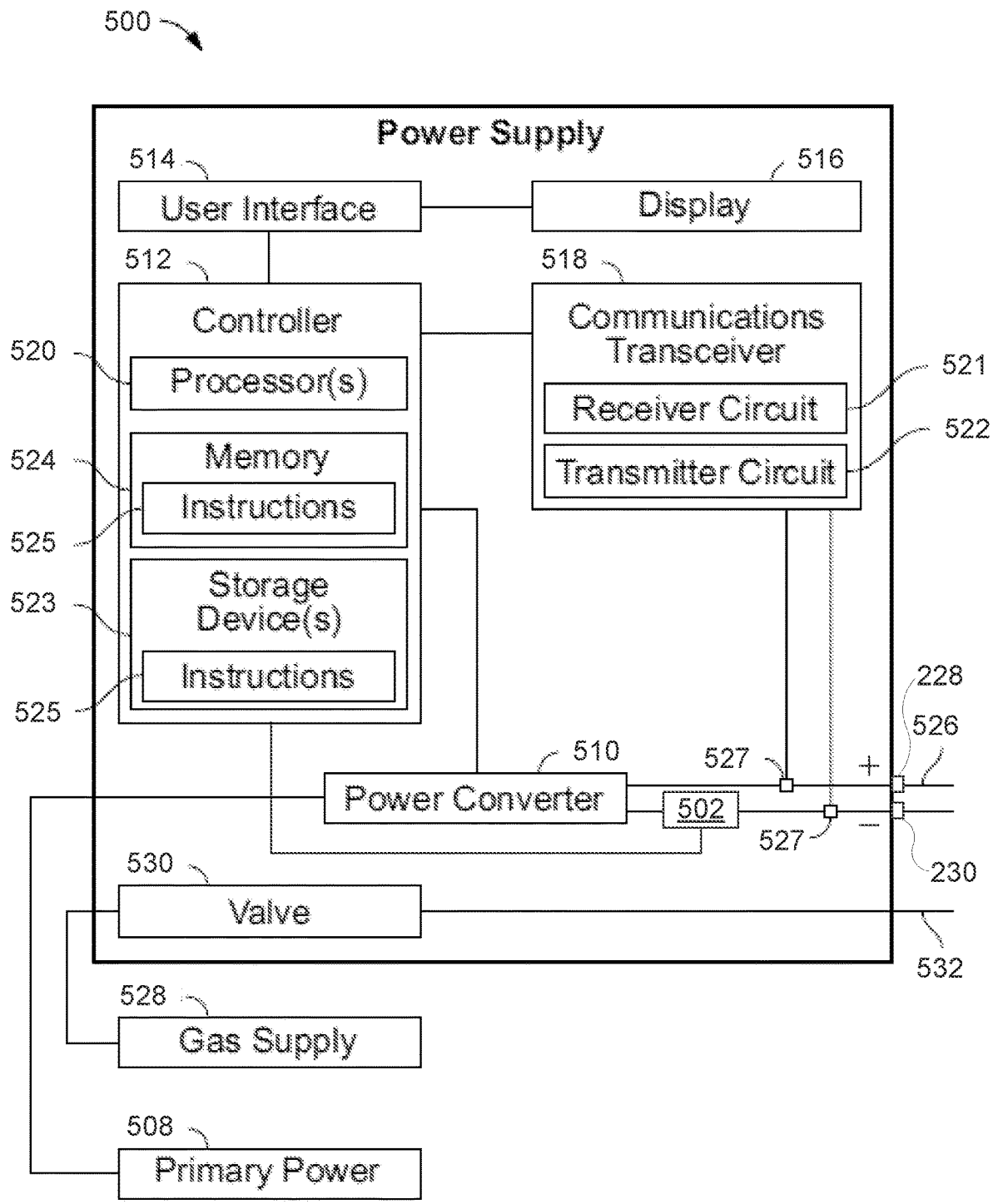
FIG. 5 is an example implementation of the preheating power supply of FIG. 3 including a bypass path prevention circuit, in accordance with aspects of this disclosure.

Instead of providing an interconnection cable as illustrated in FIGS. 3 and 4, in other examples the preheating power supply 208 is configured to reduce or prevent flow of welding current between the terminals 228, 230 (e.g., from the terminal 230 to the terminal 228). FIG. 5 is an example power supply 500 that may be used to implement the preheating power supply 208 of FIGS. 2A, 2B, and/or 3, in which a bypass path prevention circuit 502 prevents the flow of weld current from the terminal 230 to the terminal 228, while permitting preheating current to be output by the preheating power supply 208. The bypass path prevention circuit 502 may be internal or external to a housing of the power supply 500.

The example power supply 500 powers, controls, and supplies consumables to a welding application. In some examples, the power supply 500 directly supplies input power to the welding torch 201. In the illustrated example, the welding power supply 500 is configured to supply welding power to welding operations and/or preheating power to preheating operations. The example power supply 500 may also provide power to a wire feeder to supply the electrode wire 114 to the welding torch 201 (e.g., for GMAW welding and/or flux core arc welding (FCAW)).

The power supply 500 receives primary power 508 (e.g., from the AC power grid, an engine/generator set, a battery, or other energy generating or storage devices, or a combination thereof), conditions the primary power, and provides an output power to one or more welding devices and/or preheating devices in accordance with demands of the system. The primary power 508 may be supplied from an offsite location (e.g., the primary power may originate from the power grid). The welding power supply 500 includes a power converter 510, which may include transformers, rectifiers, switches, and so forth, capable of converting the AC input power to AC and/or DC output power as dictated by the demands of the system (e.g., particular welding processes and regimes). The power converter 510 converts input power (e.g., the primary power 508) to welding-type power based on a weld voltage setpoint and outputs the welding-type power via a weld circuit.

In some examples, the power converter 510 is configured to convert the primary power 508 to both welding-type power and auxiliary power outputs. However, in other examples, the power converter 510 is adapted to convert primary power only to a weld power output, and a separate auxiliary converter is provided to convert primary power to auxiliary power. In some other examples, the power supply 500 receives a converted auxiliary power output directly from a wall outlet. Any suitable power conversion system or mechanism may be employed by the power supply 500 to generate and supply both weld and auxiliary power.

The power supply 500 includes a controller 512 to control the operation of the power supply 500. The welding power supply 500 also includes a user interface 514. The controller 512 receives input from the user interface 514, through which a user may choose a process and/or input desired parameters (e.g., voltages, currents, particular pulsed or non-pulsed welding regimes, and so forth). The user interface 514 may receive inputs using any input device, such as via a keypad, keyboard, buttons, touch screen, voice activation system, wireless device, etc. Furthermore, the controller 512 controls operating parameters based on input by the user as well as based on other current operating parameters. Specifically, the user interface 514 may include a display 516 for presenting, showing, or indicating, information to an operator. The controller 512 may also include interface circuitry for communicating data to other devices in the system, such as the wire feeder. For example, in some situations, the power supply 500 wirelessly communicates with other welding devices within the welding system. Further, in some situations, the power supply 500 communicates with other welding devices using a wired connection, such as by using a network interface controller (NIC) to communicate data via a network (e.g., ETHERNET, 10BASE2, 10BASE-T, 100BASE-TX, etc.). In the example of FIG. 1, the controller 512 communicates with the wire feeder via the weld circuit via a communications transceiver 518.

The controller 512 includes at least one controller or processor 520 that controls the operations of the welding power supply 500. The controller 512 receives and processes multiple inputs associated with the performance and demands of the system. The processor 520 may include one or more microprocessors, such as one or more "general-purpose" microprocessors, one or more special-purpose microprocessors and/or ASICS, and/or any other type of processing device. For example, the processor 520 may include one or more digital signal processors (DSPs).

The example controller 512 includes one or more storage device(s) 523 and one or more memory device(s) 524. The storage device(s) 523 (e.g., nonvolatile storage) may include ROM, flash memory, a hard drive, and/or any other suitable optical, magnetic, and/or solid-state storage medium, and/or a combination thereof. The storage device 523 stores data (e.g., data corresponding to a welding application), instructions (e.g., software or firmware to perform welding processes), and/or any other appropriate data. Examples of stored data for a welding application include an attitude (e.g., orientation) of a welding torch, a distance between the contact tip and a workpiece, a voltage, a current, welding device settings, and so forth.

The memory device 524 may include a volatile memory, such as random access memory (RAM), and/or a nonvolatile memory, such as read-only memory (ROM). The memory device 524 and/or the storage device(s) 523 may store a variety of information and may be used for various purposes. For example, the memory device 524 and/or the storage device(s) 523 may store processor executable instructions 525 (e.g., firmware or software) for the processor 520 to execute. In addition, one or more control regimes for various welding processes, along with associated settings and parameters, may be stored in the storage device 523 and/or memory device 524, along with code configured to provide a specific output (e.g., initiate wire feed, enable gas flow, capture welding data, detect short circuit parameters, determine amount of spatter) during operation.

In some examples, the welding power flows from the power converter 510 through a weld cable 526. The example weld cable 526 is attachable and detachable from the terminals 228, 230 at each of the welding power supply 500 (e.g., to enable ease of replacement of the weld cable 526 in case of wear or damage). Furthermore, in some examples, welding data is provided with the weld cable 526 such that welding power and weld data are provided and transmitted together over the weld cable 526. The communications transceiver 518 is communicatively coupled to the weld cable 526 to communicate (e.g., send/receive) data over the weld cable 526. The communications transceiver 518 may be implemented based on various types of power line communications methods and techniques. For example, the communications transceiver 518 may utilize IEEE standard P1901.2 to provide data communications over the weld cable 526. In this manner, the weld cable 526 may be utilized to provide welding power from the welding power supply 302a, 302b to the wire feeder and the welding tool 108. Additionally or alternatively, the weld cable 526 may be used to transmit and/or receive data communications to/from the wire feeder and the welding torch 201. The communications transceiver 518 is communicatively coupled to the weld cable 526, for example, via cable data couplers 527, to characterize the weld cable 526, as described in more detail below. The cable data coupler 527 may be, for example, a voltage or current sensor.

In some examples, the power supply 500 includes or is implemented in a wire feeder.

In some examples, a gas supply 528 provides shielding gases, such as argon, helium, carbon dioxide, mixed gases, and so forth, depending upon the welding application. The shielding gas flows to a valve 530, which controls the flow of gas, and if desired, may be selected to allow for modulating or regulating the amount of gas supplied to a welding application. The valve 530 may be opened, closed, or otherwise operated by the controller 512 to enable, inhibit, or control gas flow (e.g., shielding gas) through the valve 530. Shielding gas exits the valve 530 and flows through a cable 532 (which in some implementations may be packaged with the welding power output) to the wire feeder which provides the shielding gas to the welding application. In some examples, the power supply 500 does not include the gas supply 528, the valve 530, and/or the cable 532.

In some examples, the bypass path prevention circuit 502 includes one or more diodes, and/or other forward voltage increase device(s), similar to the forward voltage increase circuit 302 of FIGS. 3 and 4. In such examples, the bypass path prevention circuit 502 is passive and is configured to increase a forward voltage from terminal 230 to the terminal 228 (e.g., in the direction of current flow).

In some other examples, the bypass path convention circuit 502 includes one or more switching elements such as transistors or relays. The controller 512 may control the bypass path prevention circuit 502 to enable the switching elements to conduct current when the power supply 500 is outputting preheating power and/or when less than a threshold weld current is detected (e.g., via a current sensor, a voltage sensor, or another sensor) as flowing between the terminals 228, 230. Conversely, the example controller 512 may control the bypass path prevention circuit 502 when the power supply 500 is not outputting preheating power and/or when more than a threshold weld current is flowing between the terminals 228, 230. Weld current may be detected by comparing a commanded current or voltage to be output by the power converter 510 with a sensed voltage with a measured current and/or voltage.

In some examples in which a transistor is used to implement the bypass path prevention circuit 502, the controller 512 may control the transistor(s) in a linear mode, such that a voltage across the bypass path prevention circuit 502 is sufficient to reduce or prevent weld current from flowing through between the terminals 228, 230 (e.g., slightly more than the driving voltage 236.

While the example bypass path prevention circuit 502 is shown between the terminal 230 and the power converter 510, in other examples the bypass path prevention circuit 502 is additionally or alternatively configured between the power converter and the terminal 228 to increase the forward voltage in the direction of current flow.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

The present methods and/or systems may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, systems, blocks, and/or other components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

All documents cited herein, including journal articles or abstracts, published or corresponding U.S. or foreign patent applications, issued or foreign patents, or any other documents are each entirely incorporated by reference herein, including all data, tables, figures, and text presented in the cited documents.

What is claimed is:

1. A preheating power supply, comprising:
   power conversion circuitry configured to output welding-type power via a positive output power connector and a negative output power connector; and
   a bypass path prevention circuit between the power conversion circuitry and the positive output power connector or between the power conversion circuitry and the negative output power connector, and configured to:
      prevent less than a threshold voltage applied to the positive output power connector and the negative output power connector from a different power supply from causing current to flow in a first direction between the positive output power connector and the negative output power connector; and
      permit conduction of current in the first direction from the positive output power connector to the negative output power connector through the bypass path prevention circuit when more than the threshold voltage is applied between the positive output power connector and the negative output power connector by the power conversion circuitry.

2. The preheating power supply as defined in claim 1, wherein the bypass path prevention circuit comprises a diode configured to increase a forward voltage drop from the positive output power connector to the negative output power connector.

3. The preheating power supply as defined in claim 1, further comprising a controller configured to control the power conversion circuitry to output an electrode preheating voltage based on the forward voltage drop.

4. The preheating power supply as defined in claim 1, further comprising:
   a switching element configured to selectively couple the positive output power connector to the negative output power connector; and
   a switching control circuit configured to selectively control the switching element to decouple the positive output power connector and the negative output power connector.

5. The preheating power supply as defined in claim 4, wherein the switching control circuit is configured to control the switching element to decouple the positive output power connector and the negative output power connector when the power conversion circuitry is not outputting current via the positive output power connector and the negative output power connector.

6. The preheating power supply as defined in claim 4, wherein the switching control circuit is configured to control the switching element to couple the positive output power connector and the negative output power connector when the power conversion circuitry is outputting current via the positive output power connector and the negative output power connector.

7. The preheating power supply as defined in claim 1, wherein the bypass path prevention circuit comprises a resistor.

8. The preheating power supply as defined in claim 1, wherein the bypass path prevention circuit comprises a load switch.

9. The preheating power supply as defined in claim 1, wherein the bypass path prevention circuit comprises a negative temperature coefficient thermistor.

10. The preheating power supply as defined in claim 1, wherein the welding-type power comprises electrode preheating current.

* * * * *